US010546204B1

(12) United States Patent
Kumar et al.

(10) Patent No.: US 10,546,204 B1
(45) Date of Patent: Jan. 28, 2020

(54) ITEM INFORMATION DISCOVERY WITH A WEARABLE DEVICE

(71) Applicant: Amazon Technologies, Inc., Reno, NV (US)

(72) Inventors: Dilip Kumar, Seattle, WA (US); William Spencer Worley, III, Camano Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 38 days.

(21) Appl. No.: 14/084,045

(22) Filed: Nov. 19, 2013

Related U.S. Application Data

(60) Provisional application No. 61/772,868, filed on Mar. 5, 2013.

(51) Int. Cl.
*H04M 1/00* (2006.01)
*G06K 9/32* (2006.01)
*G06K 9/00* (2006.01)
*G02B 27/01* (2006.01)

(52) U.S. Cl.
CPC ......... *G06K 9/3241* (2013.01); *G02B 27/017* (2013.01); *G06K 9/00335* (2013.01)

(58) Field of Classification Search
CPC ...... G06Q 50/00; G06Q 30/02; G06Q 10/087; H04Q 5/22; G06F 3/033; G06F 3/017; G08B 13/181; G09G 5/00; G06K 9/78; G02B 27/017
USPC ........... 340/573.4; 705/28, 2, 26.9; 715/863; 345/633, 156; 382/100; 455/456.3, 455/456.1; 235/385
See application file for complete search history.

(56) References Cited

U.S. PATENT DOCUMENTS

| | | | |
|---|---|---|---|
| 6,104,295 A * | 8/2000 | Gaisser | G06K 19/07749 340/572.8 |
| 7,225,980 B2 | 6/2007 | Ku et al. | |
| 7,949,568 B2 | 5/2011 | Fano et al. | |
| 8,009,864 B2 | 8/2011 | Linaker et al. | |
| 8,055,296 B1 * | 11/2011 | Persson | G02B 27/017 455/456.1 |
| 8,175,925 B1 | 5/2012 | Rouaix | |
| 8,189,855 B2 | 5/2012 | Opalach et al. | |
| 8,423,431 B1 * | 4/2013 | Rouaix | B65G 1/1373 705/28 |
| 8,630,924 B2 | 1/2014 | Groenevelt et al. | |
| 8,688,598 B1 | 4/2014 | Shakes et al. | |
| 9,473,747 B2 | 10/2016 | Kobres et al. | |
| 2003/0002712 A1 | 1/2003 | Steenburgh et al. | |
| 2004/0181467 A1 | 9/2004 | Raiyani et al. | |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Abdul-Samad A Adediran
(74) *Attorney, Agent, or Firm* — Athorus, PLLC

(57) ABSTRACT

This disclosure describes architectures and techniques to provide information to a user about items with which the user interacts. In some instances, a user may utilize a wearable device that is configured to interact with one or more components of an information discovery system to obtain information about items in the user's environment.

20 Claims, 6 Drawing Sheets

(56) References Cited

U.S. PATENT DOCUMENTS

| | | |
|---|---|---|
| 2008/0055087 A1 | 3/2008 | Horii et al. |
| 2008/0077511 A1 | 3/2008 | Zimmerman |
| 2008/0109114 A1 | 5/2008 | Orita et al. |
| 2008/0126126 A1* | 5/2008 | Ballai ................ G06F 19/327 705/2 |
| 2009/0121017 A1* | 5/2009 | Cato ................ G06Q 10/087 235/385 |
| 2009/0245573 A1 | 10/2009 | Saptharishi et al. |
| 2010/0125816 A1* | 5/2010 | Bezos ................ G06F 1/1626 715/863 |
| 2011/0011936 A1 | 1/2011 | Morandi et al. |
| 2011/0143779 A1* | 6/2011 | Rowe ................ G06Q 30/02 455/456.3 |
| 2012/0242570 A1* | 9/2012 | Kobayashi ............ G06F 3/017 345/156 |
| 2012/0284132 A1 | 11/2012 | Kim et al. |
| 2013/0044130 A1* | 2/2013 | Geisner ................ G09G 5/00 345/633 |
| 2013/0076898 A1 | 3/2013 | Philippe et al. |
| 2013/0223673 A1* | 8/2013 | Davis ................ G06K 9/78 382/100 |
| 2013/0253700 A1 | 9/2013 | Carson et al. |
| 2014/0279294 A1 | 9/2014 | Field-Darragh et al. |
| 2015/0019391 A1 | 1/2015 | Kumar et al. |
| 2015/0073907 A1 | 3/2015 | Purves et al. |
| 2015/0120498 A1* | 4/2015 | Carney ................ G06Q 30/02 705/26.9 |

OTHER PUBLICATIONS

Cristian Pop, "Introduction to the BodyCom Technology", Microchip AN1391, May 2, 2011, pp. 1-26, vol. AN1391, No. DS01391A, Publisher 2011 Microchip Technology Inc.

* cited by examiner

ITEM INFORMATION DISCOVERY WITH A WEARABLE DEVICE

CROSS-REFERENCE TO RELATED APPLICATIONS

This application claims the benefit of U.S. Provisional Application No. 61/772,868, filed Mar. 5, 2013 entitled "Item Information Discovery With A Wearable Device", which is incorporated herein by reference in its entirety.

BACKGROUND

Many locations are becoming more connected with the proliferation of computing devices such as desktops, tablets, entertainment systems, and portable communication devices. As computing devices evolve, many different ways have been introduced to allow users to interact with the devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
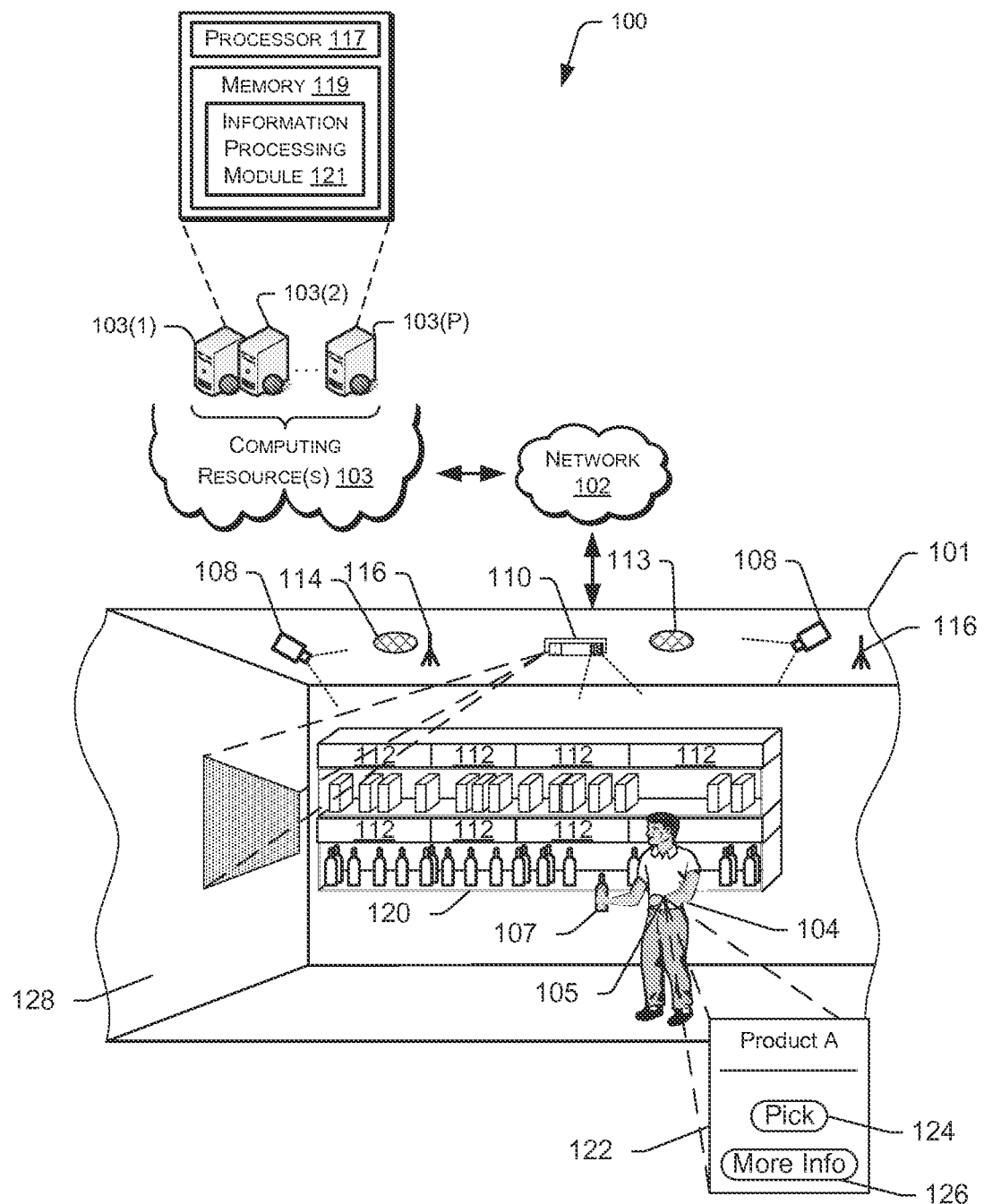
FIG. 1 shows an example information discovery system implemented in a materials handling facility, in accordance with an implementation.

This disclosure describes architectures and techniques to provide information to a user about items with which the user interacts. In some instances, the user may utilize a wearable device that is configured to communicate with an information discovery system and provide information to a user about items. A "wearable device," as used herein, is any form of computing device(s) that may be worn, placed upon and/or carried by a user that is capable of communicating with other devices, such as computing devices of an information discovery system, and capable of presenting information to the user (e.g., audible, visual, tactile). Example form factors and components of a wearable device are discussed further below.

The following is an example use case of a wearable device. A user, Steve, may utilize a wearable device in a materials handling facility to obtain information about items within the materials handling facility. For example, Steve may select an item from a shelf within the materials handling facility and receive initial item information via a presentation from the wearable device. In one implementation, imaging devices (e.g., still cameras, video cameras), which may be part of an information discovery system and located throughout the materials handling facility may identify Steve when he enters the materials handling facility and monitor him as he moves around the materials handling facility. When Steve selects an item from a shelf, the information discovery system may obtain/capture an image(s) of the selected item, and/or the shelf from which the item was removed, and utilizing a combination of: knowledge of items stored at different locations in the materials handling facility: Steve's current location within the materials handling facility; and/or image processing to identify the item, may determine the item selected by Steve. For example, images of the shelf from which the item was removed may be compared to images of the shelf after the item was removed to identify the specific location, size and/or shape of the removed item. Based on knowledge of items stored on that shelf, the removed item can be identified based on the difference between the images.

Upon determining the item selected by Steve, initial item information may be sent to Steve's wearable device and presented to Steve. For example, if the item is a book, the wearable device may present initial item information, such as the books title, author, publication date, price to rent or purchase the book, etc. The wearable device may also include one or more controls (e.g., buttons) that allow Steve to further interact with the wearable device. For example, the wearable device may present a "Pick" control or a "More Info" control. The user can interact with the controls and obtain additional information about the selected item (generally referred to herein as "additional item information") and/or perform other actions, such as initiate, a pick, purchase and/or fulfillment/delivery of the item. Example, interactions with the wearable device will be described in further detail below.

This brief introduction is provided for the reader's convenience and is not intended to limit the scope of the claims, nor the proceeding sections. Furthermore, the techniques described below may be implemented in a number of ways and in a number of contexts. One example implementation and context is provided with reference to the following figures, as described below in more detail. It is to be appreciated, however, that the following implementation and context is but one of many.

FIG. 1 shows an example information discovery system 100 implemented in a materials handling facility 101, in accordance with an implementation. A materials handling facility 101 may include, but is not limited to, one or more of: warehouses, distribution centers, cross-docking facilities, order fulfillment facilities, packaging facilities, shipping facilities, retail stores, libraries, rental locations (e.g., DVD rentals), museums, or any other facility or combinations of facilities in which one or more functions (e.g., item discovery) may be performed. While the examples discussed herein, describe a wearable device interacting with an item discovery system to obtain information about items in a materials handling facility, it will be appreciated that the implementations described herein are equally applicable to locations other than materials handling facilities. For example, implementations described herein may also be implemented in open spaces (e.g., parks, outside of building, streets) and used to obtain information about items (e.g., buildings, monuments, plants, animals) at those locations.

Returning to FIG. 1, a user 104 located in the materials handling facility 101 may wear or otherwise have a wearable device 105 and obtain information about items 107 located within the materials handling facility 101. Generally, the wearable device 105, as discussed in further detail below, has at least a wireless module to facilitate communication with the information discovery system 100 and a display (e.g., a touch based display) to facilitate visible presentation to and interaction with the user 104. The wearable device 105 may store a unique identifier and provide that unique identifier to the information discovery system 100. In some instances, the wearable device may also have other features, such as audio input/output (e.g., speaker(s), microphone(s)), video input/output (camera(s), projector(s)), haptics (e.g., keyboard, keypad, touch screen, joystick, control buttons) and/or other components. One example implementation of the wearable device 105 is provided below in more detail with reference to FIGS. 3-4.

In some instances the wearable device 105 may operate in conjunction with or may otherwise utilize or communicate with one or more components of the information discovery system 100. Likewise, components of the information discovery system 100 may interact and communicate with the wearable device 105 as well as identify the user and/or communicate with other components of the information discovery system 100.

Generally, the information discovery system 100 may include one or more input/output devices, such as imaging devices (e.g., cameras) 108, projectors 110, displays 112, speakers 113, microphones 114, etc. to facilitate communication between the information discovery system 100 and the user 104. Likewise, the information discovery system 104 may also include one or more communication devices, such as wireless antennas 116 that facilitate wireless communication (e.g., Wi-Fi, Near Field Communication (NFC), Bluetooth) between the information discovery system 100 and the wearable device 105. The information discovery system may also include one or more computing resource(s) 103 that may be local to the environment (e.g., materials handling facility), remote from the environment, or any combination thereof.

The information discovery system 100 may utilize antennas 116 within the materials handling facility to create a local wireless network (e.g., Wi-Fi) so that the wearable device 105 can connect to and communicate with the information discovery system 100. Likewise, in instances when one or more of the components of the information discovery system 100 are remote from the materials handling facility, they may communicate with other components of the information discovery system 100 and/or the wearable device 105 via a network 102. Additional details regarding the computing resource(s) are discussed below with respect to FIG. 2.

In one implementation, the wearable device 105 may be provided to the user 104 when the user arrives at the materials handling facility 101. In such an instance, the user 104 may identify themself to the information discovery system 100 and the wearable device 105 may be associated with the user and/or user's account by associating a unique identifier of the wearable device 105 with the identified user and/or the user's account. As discussed in further detail below, a user may identify them themself by presenting an identifier, such as a card or badge, providing a user identification and password, etc. In other implementations, the user may be identified by the materials handling system 101. For example, one or more images of the user may be captured and processed to identify the user, a finger print scanner may be utilized to identify the user, and/or other biometric identifications may be performed. In one implementation, facial recognition may be performed on the images and identified features may be compared with information stored about users to identify the user and a corresponding user account.

Once associated, the user 104 may utilize the wearable device 105 to obtain information about items 107 within the materials handling facility, as well as information about the user 104. As the user leaves the materials handling facility, the user may return the wearable device 105. When returned, the association between the user 104 and the wearable device 105 may be removed so that the wearable device 105 can be reissued to another user when he/she arrives at the materials handling facility 101.

In an alternative implementation, rather than returning the wearable device 105, the user 104 may keep the wearable device and the information discovery system 100 may maintain the relationship between the user 104 and the wearable device 105 so that when the user returns to the materials handling facility, or to another materials handling facility that provides communication with the information discovery system 100, the user can again use the wearable device 105 to interact with the information discovery system 100.

In still another implementation, the wearable device may be owned by the user and the association between the user and the wearable device already know to the information discovery system 100. As such, when the user arrives at the materials handling facility, the information discovery system 100 identifies the wearable device and/or the user and enables interaction with the information discovery system so that the user can obtain information about items within the materials handling facility.

The following is an example use case that utilizes the wearable device in a materials handling facility to facilitate interaction with the information discovery system 100 and picking of an item 107. In this example, the user 104 owns the wearable device 105 and the information discovery system 100 has a relationship between the user's 104 account and the unique identifier of the wearable device 105 stored in a data store accessible by the computing resource(s) 103.

Upon entering the materials handling facility, the wearable device 105 connects with the information discovery system 100 via a wireless network and an antenna 116 accessible within the materials handling facility 101. Upon connecting with the information discovery system 100, information (e.g., unique identifier) is exchanged and the wearable device and associated user account is identified. In some implementations, an imaging device 108 may also obtain/capture one or more images of the user 104 and provide the image(s) to the computing resource(s) 103 for processing. The computing resource(s) 103 may process the image(s) and if identifying information about the user 104 is maintained, the processed image(s) may be compared with the stored identifying information to further verify the identity of the user. Likewise, other unique identifiers (e.g., the color of the user's shirt, shoes, hat, pants) may be identified and used to assist in identifying the user as they move around the materials handling facility. For example, if the user is wearing a bright yellow shirt, that shirt may be identified and used as a temporary data point for use in identifying the user as they move around the materials handling facility that day.

As the user moves around the materials handling facility, the information discovery system 100 may assist the user in discovering information about items by processing images collected by input/output components 108-116 positioned around the materials handling facility. For example, imaging devices 108 may be used to obtain/capture images within the materials handling facility 101 that are processed by the computing resource(s) 103 to identify the location of the user 104. Likewise, microphones 114 may record sounds made by the user and/or emitted by the wearable device and the computing resource(s) may process those sounds to determine a location of the user. For example, each wearable device 105 may emit a unique sound or series of sounds that, while not audible to a human, are captured by multiple microphones 114 positioned throughout the materials handling facility. Those sounds may be provided to the computing resource(s) and processed to determine the location of the user 104. For example, based on knowledge of the locations of the microphones, a time offset between audio signals received by each microphone can be computed to determine a location of the wearable device, and thus the user.

In order to identify the time offsets between signals received by various microphones, in some instances the computing resource(s) 103 compile each audio signal received by respective audio transducers and then determines the time offsets between the signals by, for instance, using any time-difference-of-arrival ("TDOA") technique, or any other suitable technique. After identifying the respective time offsets, the computing resource(s) 103 can determine a direction and/or source location of the audio.

In addition to, or as an alternative to visual and/or audio location determination, the information discovery system 100 may also utilize other techniques, such as triangulation between antennas 116, to determine the location of the user 104 as the user moves through the materials handling facility 101. In other examples, the wearable device 105 may include a global positioning system (GPS) receiver that obtains GPS information as to the location of the wearable device 105. In such an implementation, the wearable device 105 may provide the received GPS information to the information discovery system 100. In still other examples, the wearable device may interact with and/or be identifiable by an indoor positioning system so that the location of the user and the wearable device can be determined.

When the user 104 selects an item 107 from a shelf 120 the information discovery system 100, either alone or in conjunction with the wearable device 105, may detect that the user has selected an item. For example, as the computing resource(s) 103 processes images received from imaging device(s) 108 it may determine that the user 104 has picked up an item. In an alternative embodiment, the images may be provided by the wearable device 105.

Upon determining that the user has selected an item, the information discovery system 100 may identify the selected item. Item identification may be done using a variety of inputs. For example, the computing resource(s) 103 may maintain inventory information for the materials handling facility and location information for where each item of inventory is stored. Based on the known location of the user 104 and the inventory in that location, the information discovery system 100 may quickly reduce the options as to what item the user has selected. In addition, image analysis may be performed to identify the item, the shape of the item or identifiers included on the item (e.g., stock-keeping unit ("SKU"), bar code, quick response code ("QR code"), label information). This may be done in a recursive manner. For example, the image may be processed to determine if an identifier for the product can be determined and matched with item inventory information stored by the information discovery system 100. If a match is found, the item is identified. If a match is not found, the image may be further analyzed to determine an approximate shape and size of the item selected by the user. The determined approximate shape and size of the item may then be compared to item inventory information stored by the information discovery system 100 for items known to be located in the area of the user. If a match is found, the item is identified.

If multiple items are in the area of the user 104 such that a single item cannot be selected based on the approximate size and shape of the item, the image may be further processed to identify other characteristics of the item, such as the items color, wording on the item, etc. In some implementations, additional information from the image other than the item may also be processed. For example, information from the shelf from which the item was selected may be processed to assist in identifying the selected item. For example, if there are multiple items on the shelf in the area from where the user removed the item that appear similar to the selected item, images of those items may be processed to assist in identifying the item; as they are likely the same item. Likewise, label information on the shelf (e.g., product name, price, bar code) may be processed to assist in identifying the item. The image may continue to be processed until the item is identified. In some implementations, images of the items on the shelf obtained before the item was removed may be compared to images of the shelf after the item was removed to assist in identifying the removed item. In still other examples, a weight and/or pressure sensor may be included in the shelf and when the item is removed the reduced weight can be measured and used to assist in identifying the item.

In some implementations, if the item includes an identifier (such as a RFID tag) the wearable device or other device may detect the identifier and provide the identifying information to the information discovery system 100.

Once the item is identified, the information discovery system 100 sends initial item information to the wearable device (or other system) such that it can be presented to the user 104. Initial item information may be any basic information about the item. For example, if the materials handling facility is a retail store, the initial item information may include an identification of the item and the price of the item. In some implementations, the user may specify what item information is to be included in the initial item information. For example, the user may specify that the initial item information for food products should include the name of the product, price, nutrition information, ingredients, expiration date, weight, size, etc. As another example, the user may include identifiers and/or rules that are used to provide initial item information. For example, if the user has specific food allergies or a desired food intake (protein, fruits, etc.), the user may specify that the initial item information should include identifiers relevant to those specifications (e.g., identify if the item includes foods for which I am allergic).

When initial item information is received by the wearable device 105, the wearable device 105 may present the information on the display of the wearable device 105. In other implementations, to preserve battery power, the received initial item information may be stored in the wearable device 105 but not presented on the display unless the user actually looks at the wearable device. For example, as discussed below, the wearable device may include one or more imaging elements (e.g., cameras) that periodically obtain/capture an image(s) that is analyzed to determine whether the user 104 is looking at the wearable device 105. Determining whether the user is looking at the wearable device 105 may be done using, for example, gaze tracking, head tracking, or any combination thereof. For example, obtained/captured images may be analyzed to determine a direction of focus of a user's eyes (gaze direction or gaze tracking) or a position of a user's head (head tracking). Gaze direction may be determined by identifying where the user's head is relative to the wearable device 105 and the relative position of a feature of the user's eyes (e.g., a retinal reflection or a pupil/iris position). For example, an analysis of one or more images can provide an indication as to whether the wearable device 105 is positioned such that the display surface is facing toward the eyes/head of the user and where the user's eyes are gazing relative to the display of the wearable device. A determination that the user's gaze is directed toward the display of the wearable device 105 and the display of the wearable device 105 is positioned in a direction of the user's face can be interpreted as confirmation that the user is looking at the wearable device 105.

In some implementations, obtained/captured images may be processed by the wearable device 105, or other computing resource(s) in communication with the wearable device 105, such that the user's pupils are identifiable. The relative position of the pupils with respect to the eye position and the position of the wearable device 105 may be used to confirm whether the user is looking at the wearable device 105. In other examples, an image can be analyzed to determine the approximate location and size of a user's head or face (head tracking). Similar algorithms can also be used to determine an approximate location and area of each of the user's eyes (or in some cases the eyes in tandem). By determining the location of the user's eyes as well as the user's head, it can be determined whether the user is looking at the wearable device 105 based on the position of the eyes with respect to the head and the wearable device 105.

If the user is not looking at the device it remains in a lower power state. In some implementations, based on the gaze tracking and or head tracking of the user it may be determined what the user is looking at and information may be proactively delivered to the wearable device. For example, if the gaze tracking identifies that the user is not looking at the wearable device but is instead looking at an item on a shelf, it may be determined what item(s) are on that shelf and initial item information about those items may be proactively delivered to the wearable device. Likewise, additional item information relating to those items may be delivered to other output devices (e.g., displays) near the user.

If it is determined that the user is looking at the device, the device may transition to a higher powered state and present the initial item information on the display of the wearable device 105. When the wearable device presents the initial item information to the user 104, it may be presented on the display of the wearable device 105 or projected from a projector of the wearable device 105 onto a nearby display surface. FIG. 1 illustrates the presentation 122 of initial item information on the display of the wearable device 105 for the selected item 107. In this example, the initial item information includes the item name "Product A". In addition to presenting the initial item information, one or more controls 124, 126 may be presented by the wearable device 105. In this example, the user is presented with a "Pick" control 124 and a "More Info" control 126. Other controls may also be presented by the wearable device 105.

The user 104 may interact with the wearable device 105 by selecting (e.g., via a touch screen) one of the controls 124-126. For example, if the user selects the "More Info" control 126, the wearable device 105 may submit a request to the information discovery system 100 for additional item information. The information discovery system 100, upon receiving an additional item information request from the wearable device 105, may retrieve additional item information and identify a display location near the user for presenting the information. For example, if the user is in a location where there are displays, such as displays 112 that are available for use, the display 112 closest to the user 104 may be selected for presenting the additional item information to the user. Alternatively, a projector 110 may be used to project additional item information onto a surface area 128 near the user 104. In still other implementations, an output device 432 (e.g., speaker) may be used to present additional item information to the user in the form of audio. For example, a speaker may be configured to present directional audio focused on the user that provides the additional item information to the user.

In still other implementations, the additional item information may be returned to the wearable device 105, and the wearable device may present the additional item information to the user. For example, the wearable device 105 may project the information using its projector onto a nearby surface. Alternatively, the wearable device 105 may be in communication with another portable device of the user (e.g., smart phone, tablet, net book) that has a larger display area. In such an instance, the additional item information may be provided by the wearable device 105 to the other user device and presented to the user 104. In still other implementations, the information discovery system 100 may communicate directly with another portable device of the user and provide the additional item information directly to the other portable device.

Regardless of how the additional item information is presented to the user 104, the user may interact with the presentation to explore and discover additional information about the item. Additional item information may be any information related to the selected item 107. Some additional item information may be the same for all users (general additional item information), whereas some additional item information may be specific to the user 104 (user specific additional item information). For example, general additional item information may include, but is not limited to, customer reviews, item details, user manuals, guides, optional accessories, etc. User specific additional item information may include, but is not limited to, whether the user 104 has previously purchased or otherwise used the item, whether the user owns substitutes for the item, whether the user owns accessories that are compatible with the item, whether other users associated with the user 104 own and/or have commented on the item, etc.

If the user selects the "Pick" control 124, an identifier of the item may be associated with the user's account so that a transition of the item can be initiated and completed, as discussed further below.

Other actions or options relating to an item may also be presented to the user. For example, if the materials handling facility is a library and the user has selected a book or DVD, rather than providing a "Pick" control and a "More Info" control, the wearable device may present a "Check-Out" control and/or "Try Sample" control. Upon selecting the "Check-Out" control the item may be allocated to the user until the user returns the item to the library. If the user selects the "Try Sample" control, the information discovery system 100 may provide a sample (e.g., first chapter of the book, trailer of a movie) that is presented to the user, now or later, via the wearable device 105 or via another device (e.g., display, projector) nearby the user 104.

As the user interacts with items, the information discovery system monitors the user's actions. For example, if after selecting the item 107, the user returns the item to the shelf and moves away from the area, any additional item information may be removed from presentation. However, if the user keeps the item (e.g., places it in a tote, cart, or carries it away), the item may be associated with the user's account so that a transition (e.g., purchase) of the item can be initiated and completed, as discussed further below. Likewise, if the user selects the "Pick" control ("Check-Out" control, or other similar control) and returns the item to the shelf, in addition to associating the item with the user's account so that a transition (purchase, check-out, rental, etc.) can be initiated and completed, it may also initiate fulfillment of the item.

Fulfillment of the item may be accomplished at the materials handling facility by retrieving the item from inventory and having it available for pickup by the user as the user is leaving the materials handling facility. In other implementations, the item may be retrieved and shipped to a user specified destination (e.g., home of the user) to complete fulfillment of the item.

The process of identifying the location and activities of the user and interacting with the wearable device continues while the user is in the materials handling facility. As the user leaves the materials handling facility the user's location is determined and completion of a check-out may be performed. For example, the information discovery system may provide information to the wearable device identifying the items selected for transition (e.g., picking, purchase, rental, check-out) by the user and/or present the information on a display to the user. The user can confirm and complete the transition (purchase, rental, check-out, etc.) of the items before exiting the materials handling facility or make modifications to the list of selected items.

While the implementations described herein discuss interaction between a wearable device and the information discovery system 100, in some implementations the information discovery system may provide information to and communicate with any other type of computing device. For example, rather than communicating with the wearable device, in some implementations, the information discovery system may communicate with a different portable device, such as a cell phone, tablet, laptop, personal digital assistant, display associated with a cart, tote, etc.

Figure 2:
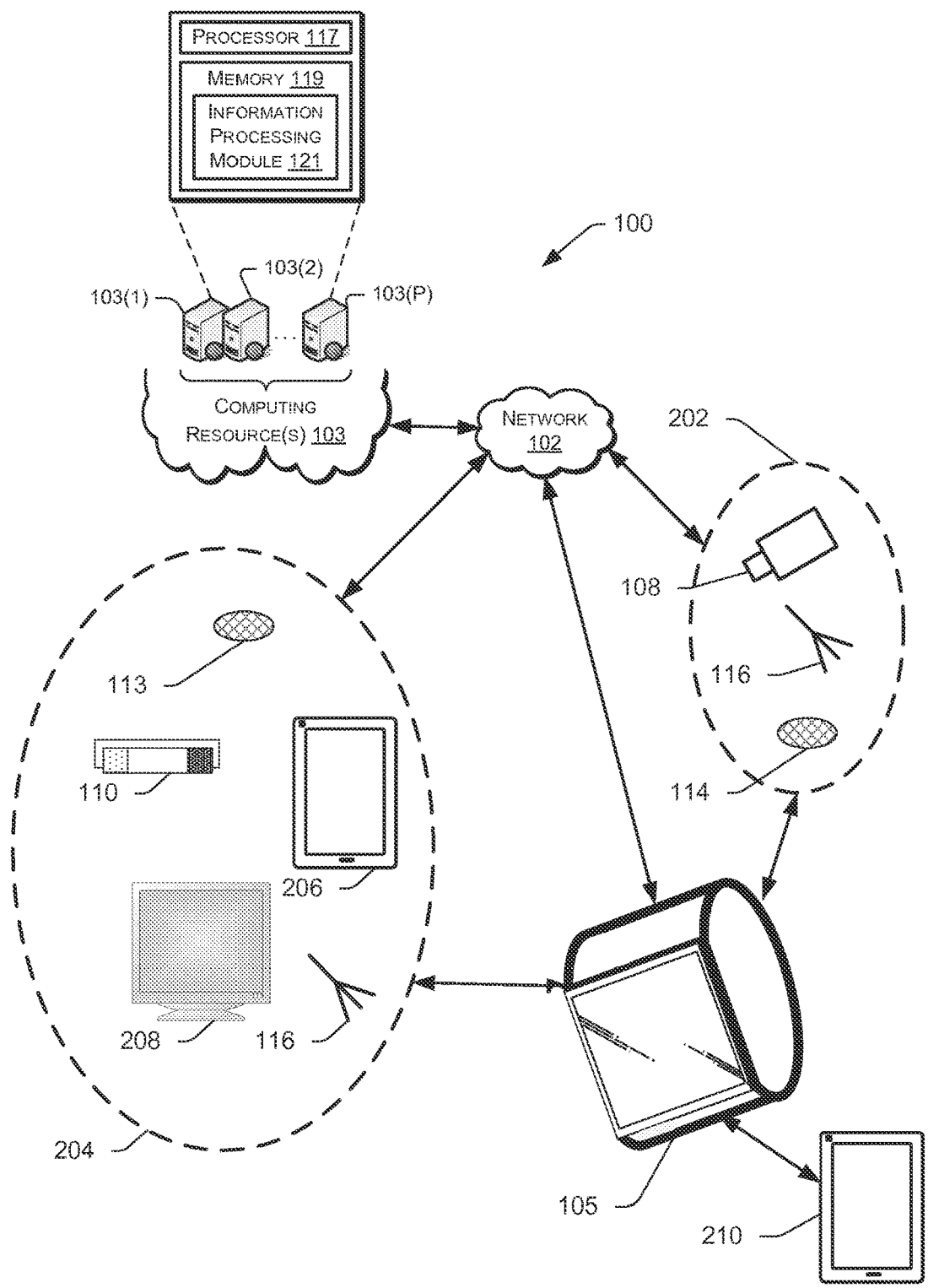
FIG. 2 shows additional components and communication paths between component types utilized in an information discovery system of FIG. 1, in accordance with an implementation.

FIG. 2 shows additional components and communication paths between component types utilized in an information discovery system 100 of FIG. 1, in accordance with an implementation. As discussed above, the wearable device 105 may communicate and interact with various components of an information discovery system 100 over a variety of communication paths. Generally, the information discovery system 100 may include input components 202, output components 204 and computing resource(s) 103. The input components may include an imaging device 108, microphone 114, antenna 116, or any other component that is capable of receiving input from the surrounding environment, from the user of the wearable device and/or from the wearable device. The output components 204 may include a projector 110, a portable device 206, a display 208, an antenna 116 and a radio (not shown), speakers 113 and/or any other component that is capable of providing output to the surrounding environment, the user of the wearable device and/or the wearable device.

The information discovery system may also include computing resource(s) 103. The computing resource(s) 103 may be local to the environment (e.g., materials handling facility), remote from the environment, or any combination thereof. Likewise, the computing resource(s) 103 may be configured to communicate over a network 102 with input components 202, output components 204 and/or directly with the wearable device 105.

As illustrated, the computing resource(s) 103 may be remote from the environment and implemented as one or more servers 103(1), 103(2), . . . . 103(P) and may, in some instances form a portion of a network-accessible computing platform implemented as a computing infrastructure of processors, storage, software, data access, and so forth that is maintained and accessible by components/device of the information discovery system 100 and/or the wearable device 105 via a network 102 such as the Internet. The computing resource(s) 103 do not require end-user knowledge of the physical location and configuration of the system that delivers the services. Common expressions associated for these remote computing resource(s) 103 include "on-demand computing," "software as a service (SaaS)," "platform computing," "network-accessible platform," "cloud services," "data centers," and so forth.

Each of the servers 103(1)-(P) include a processor 117 and memory 119, which may store or otherwise have access to an information processing module 121, which may include or provide image processing (e.g., for user identification and/or item identification), inventory tracking, and/or location determination.

The network 102 may utilize wired technologies (e.g., wires, USB, fiber optic cable, etc.), wireless technologies (e.g., RF, IR, NFC, cellular, satellite, Bluetooth, etc.), or other connection technologies. The network 102 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

In some instances, the wearable device may also be configured to communicate with another device of the user 104 (e.g., over a wired and/or wireless communication path, such as the network 102), such as the user's smart phone, tablet, and/or other portable device 210. In such an instance, the wearable device may be able to provide information to the user's other portable device 210, such as additional item information. Likewise, the wearable device may also be configured to receive information from the user's portable device 210, such as messages, notifications, images, etc. Generally, the wearable device 105, in some implementations, may operate as an extension to the user's portable device 210. Likewise, in some implementations, the portable device 210 may be configured to provide additional capacity for the wearable device 105 (e.g., additional processing capability, storage, display area).

In some implementations, the portable device 210 may provide one or more of the components/elements/modules discussed herein as included in the wearable device 105. For example, in some implementations, the wearable device may only communicate with the portable device 210 (e.g., via Bluetooth or NFC) and the portable device 210 may communicate with the information discovery system 100 on behalf of the wearable device 105. Likewise, the portable device 210 may provide some or all of the processing and provide images to the wearable device 105 that are presented on the display of the wearable device 105. In such implementations, the wearable device 105 may include fewer components than those discussed herein and utilize components of the portable device 210 to provide the features and functions discussed herein. Alternatively, some or all of the processing may be performed by the computing resources 103 and images provided to the wearable device for display. In such implementations, the wearable device may include a reduced component set. For example, the wearable device may only have the capability to receive images (e.g., from the portable device and/or the computing resource) and display those images. Likewise, the wearable device may be configured to capture images (e.g., of the user) and provide those images to the portable device and/or computing resources for processing. The wearable device may also be capable of receiving other commands from the portable device and/or computing resources and executing those commands. For example, the portable device may process images provided by the wearable device to determine whether the user is looking at the wearable device. Based on the processing, a command may be provided to the wearable device providing instructions on whether the display information on the display screen. The wearable device, upon receiving such a command may execute the command.

Figure 3:
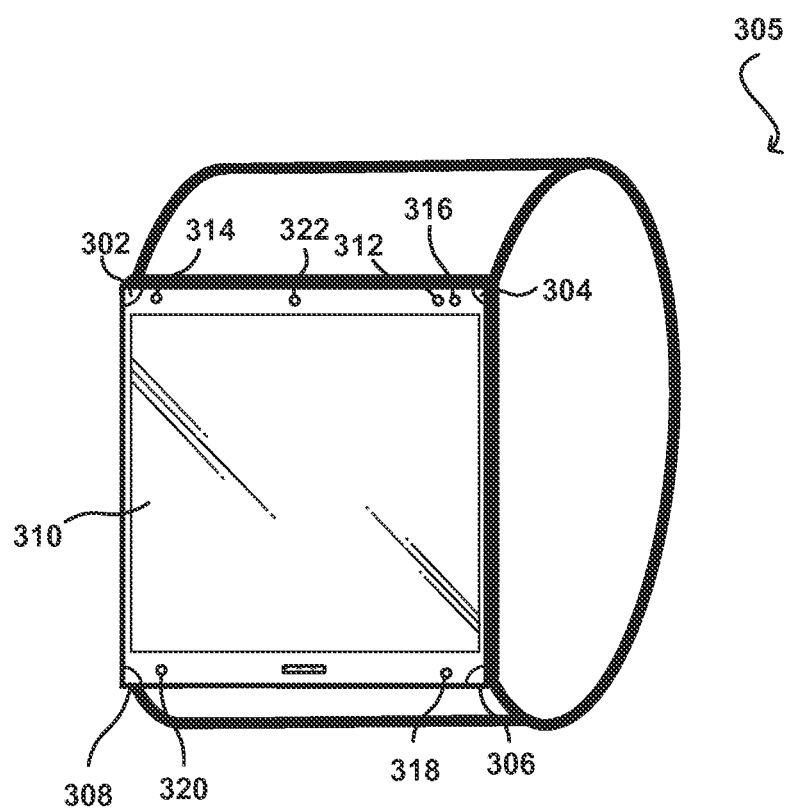
FIG. 3 illustrates an example wearable device that may be utilized in the information discovery system of FIG. 1, in accordance with an implementation.

FIG. 3 illustrates an example wearable device 305 including multiple components that can be used to capture various types of input and provide various outputs, in accordance with different implementations. It should be understood that, while the components of the example device are shown to be on a "front" of the device, there can be similar or alterative components on the sides or back of the device as well (or instead). Further, directions such as "top," "side," and "back" are used for purposes of explanation and are not intended to require specific orientations unless otherwise stated. In this example wearable device 305, there are four imaging elements (e.g., cameras) 302, 304, 306, 308 on the corners of the device and a touch-screen display 310. The touch screen display 310 may be formed using various display technologies (e.g., LCD, OLED, eInk, and so forth) in combination with a touch sensitive layer, such as capacitive touch sensor.

If the imaging elements have a sufficient wide-angle lens (e.g., a fish-eye lens), the imaging elements can have at least partially overlapping fields of view such that the imaging elements might be able to capture input from substantially any direction around the device. Examples of suitable imaging elements include hi-resolution RGB cameras and low-resolution RGB cameras. In this example, each imaging element also has an associated illumination element 314, 316, 318, 320 operable to direct light over a range of angles associated with a respective imaging element. Example illumination elements include, but are not limited to, light emitting diodes ("LED"), infrared illumination elements, visible light illumination elements, ultraviolet illumination elements, etc. Although the illumination elements are shown on the front of the device for convenience, it should be understood that the illumination elements can be on the corners of the device as well, and in at least some implementations can utilize the same wide-angle lenses to project light over a range of angles at least including the field of view of the respective imaging element. The illumination elements 314-320 are also operable to project illumination (e.g., white light or IR) to assist with image capture and/or identification of the wearable device 305 to the information discovery system 100, as discussed below. The wearable device 305 may also include a light sensor 312 for use in determining when illumination might be needed. A projector 322, such as a pico-projector, visual projector, structured light projector, etc., may also be included on the wearable device 305.

As discussed, an advantage of having a large number of imaging elements, illumination elements, touch-based displays, projectors and other such input components is to facilitate interaction with the user of the wearable device 305 and/or to communicate with the information discovery system 100. For example, if the user is in a crowded area such that detection of the user is difficult, the illumination element 312 may emit a light or light pattern to aid in the location detection of the user by the information discovery system 100. In some implementations, the light or light pattern may not be perceivable by a human but detectable by one or more of the image captures devices within the environment. For example, the illumination element 312 may emit a light pattern using infrared light. The infrared light may not be visible to humans but detectable by the image capture devices. For example, a series of images may be captured and analyzed to identify a pattern of light emitted by the wearable device. The pattern of light identified from the series of images may be unique to and associated with the wearable device so that the wearable device can be identified.

In addition to imaging elements and touch-based input, as discussed below, the devices may also include a variety of other input components, such as an accelerometer, gyroscope, inertial sensor, pressure sensor, microphone, a barometer, a global positioning system (GPS), a compass, and the like.

Figure 4:
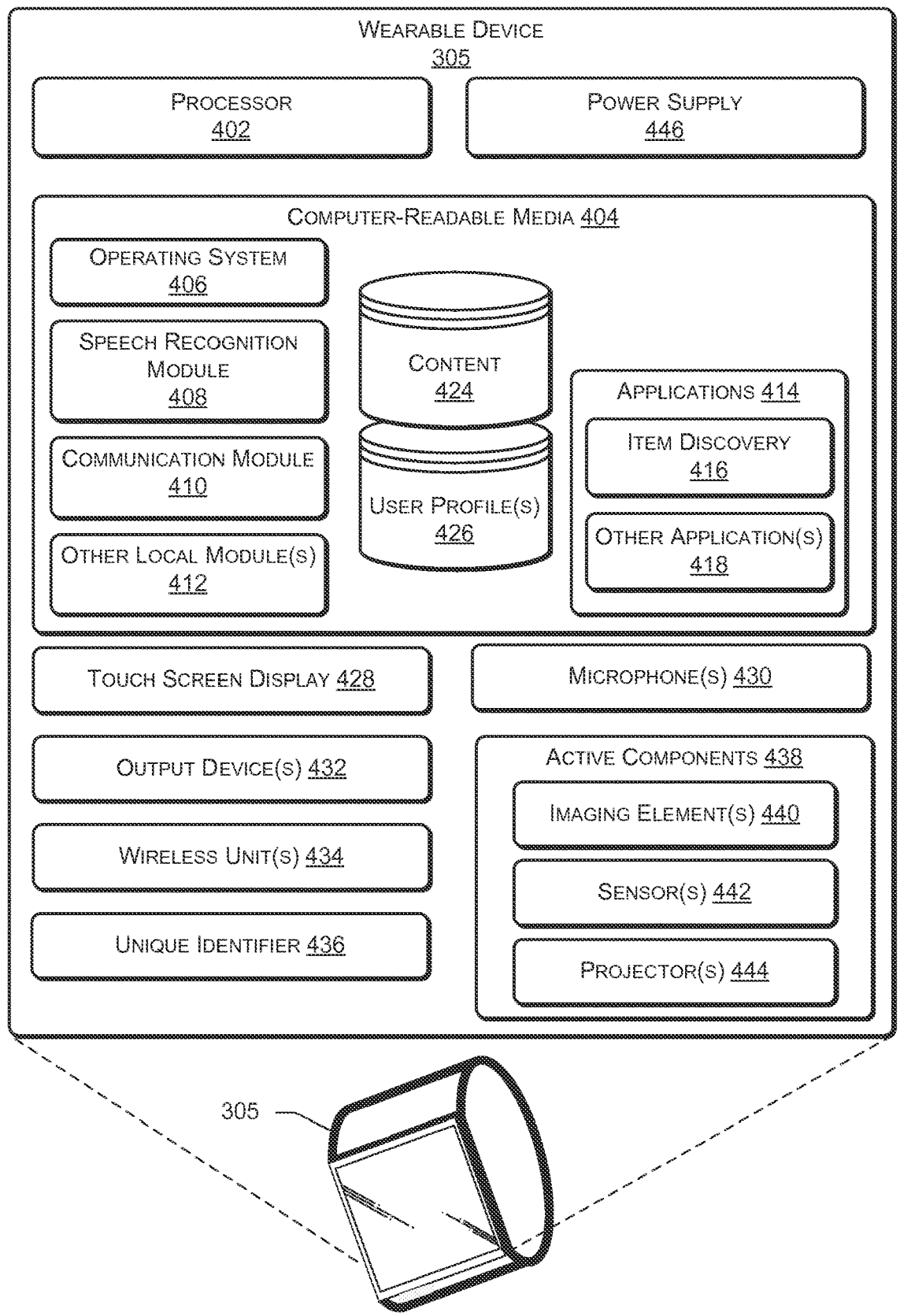
FIG. 4 illustrates example functional components of the example wearable device of FIG. 3, in accordance with an implementation.

FIG. 4 illustrates example functional components of the example wearable device of FIG. 3, in accordance with an implementation. The wearable device 305 includes one or more processors 402 and computer-readable media 404. The computer-readable media 404 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology. The computer-readable media 404 may be implemented as computer-readable storage media ("CRSM"), which may be any available physical media accessible by the processor(s) 402 to execute instructions stored on the media 404. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 402.

Several modules such as instruction, data stores, and so forth may be stored within the computer-readable media 404 and configured to execute on the processor(s) 402. A few example functional modules are shown stored in the computer-readable media 404, although the same functionality may alternatively be implemented in hardware, firmware, or as a system on a chip (SOC).

An operating system module 406 may be configured to manage hardware and services within and coupled to the wearable device 305 for the benefit of other modules. A speech recognition module 408 may employ any number of conventional speech recognition techniques such as use of natural language processing and extensive lexicons to interpret voice input. A communication module 410, such as a wireless transceiver, facilitates communication, such as cellular communication, RF communication, Wi-Fi communication, Bluetooth communication, satellite-based communication, optical communication, and so forth. For example, the communication module 410 may facilitate communication with the information discovery system 100 via the network 102 or over another wired and/or wireless communication path. Other local modules 412 may also be present on the device, depending upon the implementation and configuration of the device. These modules may include more extensive speech recognition techniques, filters and echo cancellation modules, voice recognition modules, and so forth.

The wearable device 305 may also include a plurality of applications 414 stored in the computer-readable media 404 or otherwise accessible to the wearable device 305. In this implementation, the applications 414 are item discovery 416 and other applications 418. However, the wearable device 305 may include any number or type of applications and is not limited to the specific example shown here. Data stores may also be stored locally on the media 404, including a content data store 424 and one or more user profiles 426 of users that have interacted with and/or use the wearable device 305. The content data store 424 may include various content that may be played or presented by the wearable device, such as initial item information, music, books, magazines, videos and so forth. The user profile(s) data store 426 may include user characteristics, preferences (e.g., what content should be presented as initial item information), usage history, purchase history, and other information specific to an individual user.

Generally, the wearable device 305 has a touch screen display 428 and may include other input devices, such as a keypad, control buttons, etc. One or more microphones 430 may be included to receive audio input. Output devices 432 may include a display, an illumination element (e.g., LED), speaker, a vibrator to create haptic sensations, microphone(s) or the like. The wearable device 305 might further include a wireless unit 434 coupled to an antenna to facilitate a wireless connection to one or more networks, such as the network 102. The wireless unit 434 may implement one or more of various wireless technologies, such as Wi-Fi, Bluetooth, RF, and so on.

The wearable device may also include an embedded unique identifier 436. The unique identifier may be embedded into a memory 404 of the wearable device 305 or otherwise stored and accessible by the wearable device 305.

The wearable device 305 may also be equipped with multiple active components 438. Any number of components may be used. Representative components include imaging elements 440, sensors 442 and projectors 444. The wearable device 305 may also include some form of power supply 446, such as a battery, solar power, or other form of power supply for providing power to the wearable device during operation.

While the example wearable device 305 is discussed herein as a single wearable device, in other implementations, the wearable device 305 may be implemented as multiple wearable devices. For example, one or more of the output components (e.g., microphone), imaging elements 440 (e.g., camera), sensors 442 (e.g., microphone, speaker) and/or projectors 444 may be implemented in a first wearable device, such as an earpiece and other components, such as the touch screen display 428, computer-readable media 404, etc., may be implemented as a second wearable device. In such implementations, the first wearable device and the second wearable device may communicate over a wired and/or wireless communication path (e.g., Bluetooth, NFC) and provide the features and functions of the wearable device 305, discussed herein. Generally, the wearable device 305 may be implemented as any form of computing device(s) that may be worn, placed upon and/or carried by a user that is capable of communicating with other computing devices, such as computing devices of an information discovery system, and capable of presenting information to the user (e.g., audible, visual, tactile).

Figure 5:
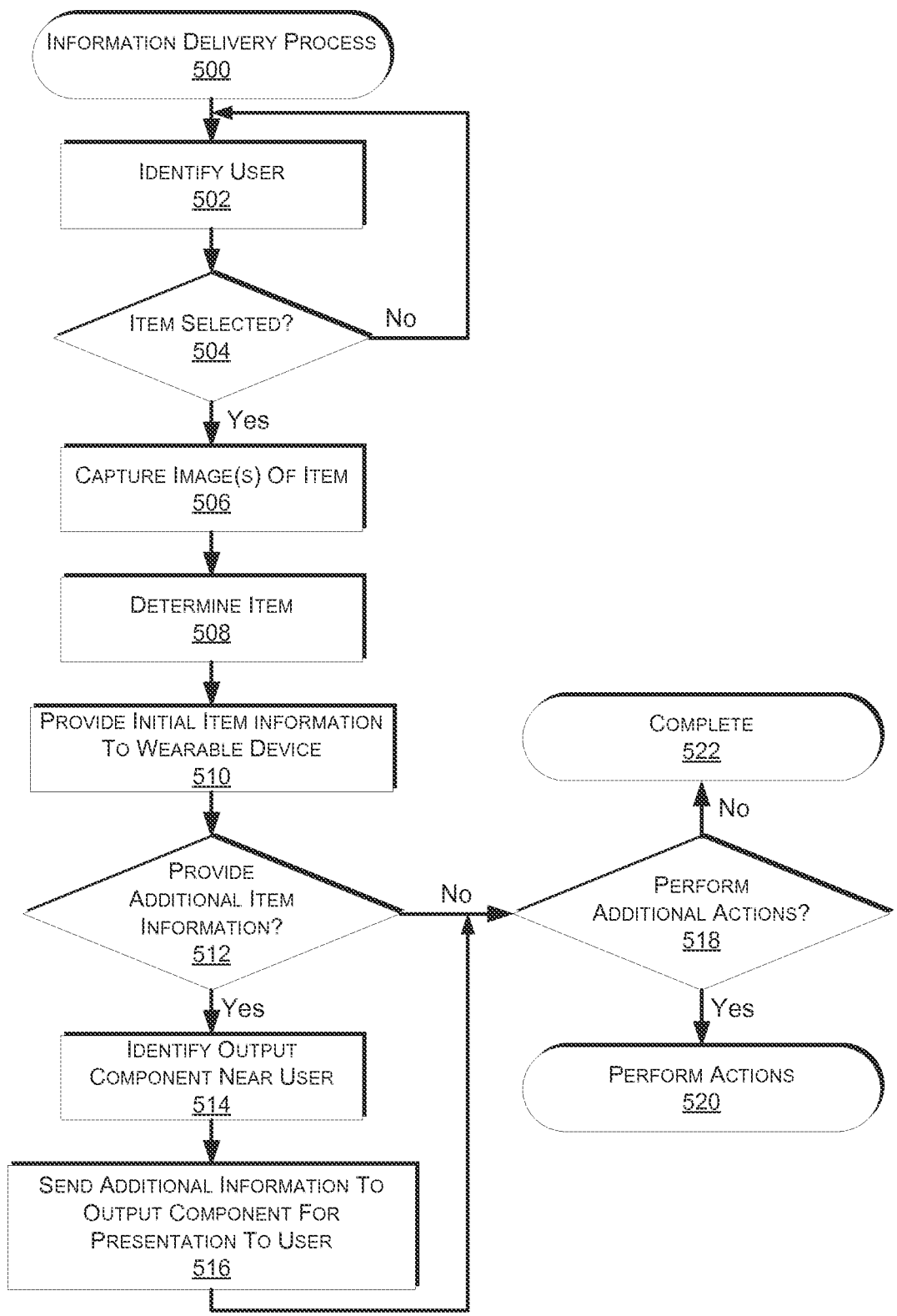
FIG. 5 depicts a flow diagram of an example information delivery process for delivering information to a user, in accordance with an implementation.

FIG. 5 depicts a flow diagram of an example information delivery process 500 for delivering information to a user, in accordance with an implementation. The process of FIG. 5 and each of the other processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

In this example, information delivery process 500 is performed by one or more components of the information discovery system 100 and begins by identifying a user, as in 502. As discussed above, a user may be identified by an information discovery system 100 when they enter a materials handling facility based on image(s) captured by one or more imaging devices 108, by the information discovery system detecting the presence of the wearable device 305, by the user providing an identification (e.g., badge, card, user identifier) or by other means.

Upon identifying the user, as the user moves around the materials handling facility and interacts with items, a determination may be made as to whether the user has selected an item, as in 504. If they have not selected an item, the example process 500 returns to block 502 and the process 500 continues. When it is determined that the user has selected an item, one or more images of the item are captured, as in 506. Images may be obtained/captured by imaging devices 108 positioned throughout the materials handling facility and/or using one of the imaging elements located on the wearable device 105. In some implementations, images of the area surrounding the item (e.g., shelf from which the item was selected, other nearby items) may also be obtained/captured. The obtained/captured images are processed to identify the selected item, as in 508. As discussed above, images may be provided to computing resource(s) 103 and processed to identify the selected item. For example, object recognition/analysis may be performed on the images to identify the shape, size, color, etc. of the item and that information may be compared with stored item information. Likewise, character recognition may be performed on the image to identify characters, words, etc. on the item.

Upon identifying the selected item, the example process 500 provides initial item information to the wearable device of the user for presentation to the user, as in 510. Initial item information may include, for example, an identification of the item, the price of the item, the weight of the item, the expiration date of the item, etc. In some implementations, a user may specify what types of information about an item are to be presented as initial item information. For example, a user may specify that initial item information should include an identification of the item, the item price, and the ingredients of the item.

After providing the initial item information, a determination may be made as to whether additional item information is to be provided, as in 512. It may be determined if additional item information has been requested if a request for additional item information is received from the wearable device. For example, if the user selects a "More Info" control presented by the wearable device, the wearable device may request that additional item information be provided to the user.

If it is determined that additional item information is to be provided, the example process 500 identifies an output component near the physical location of the user, as in 514. An output component may be any form of component that can be used to present additional item information to the user. For example, if a display is positioned near the user's location it may be selected as the output component. Likewise, if there is no display near the user, a projector may be identified that can project additional item information onto a surface near the user. As still another example, the wearable device may be identified as the output component. For example, a projector of the wearable device may be used to project additional item information onto a nearby surface for presentation to the user. Once the output component has been selected, the additional item information is sent to the selected output component for presentation to the user, as in 516.

Returning to decision block 512, if it is determined that additional item information has not been requested, a determination may be made as to whether additional actions are to be performed, as in 518. Additional actions may be any other action that is to be performed with respect to the user and/or the selected item. For example, if the user selects a "Buy" control presented by the wearable device, or if the user walks away from the area with the selected item, the additional action may be to initiate purchase and/or delivery of the selected item (e.g., delivery to the user or another destination). If it is determined that an additional action is to be performed, the additional action is performed by the example process 500, as in 520. If no additional actions are to be performed, the example process 500 completes, as in 522.

Figure 6:
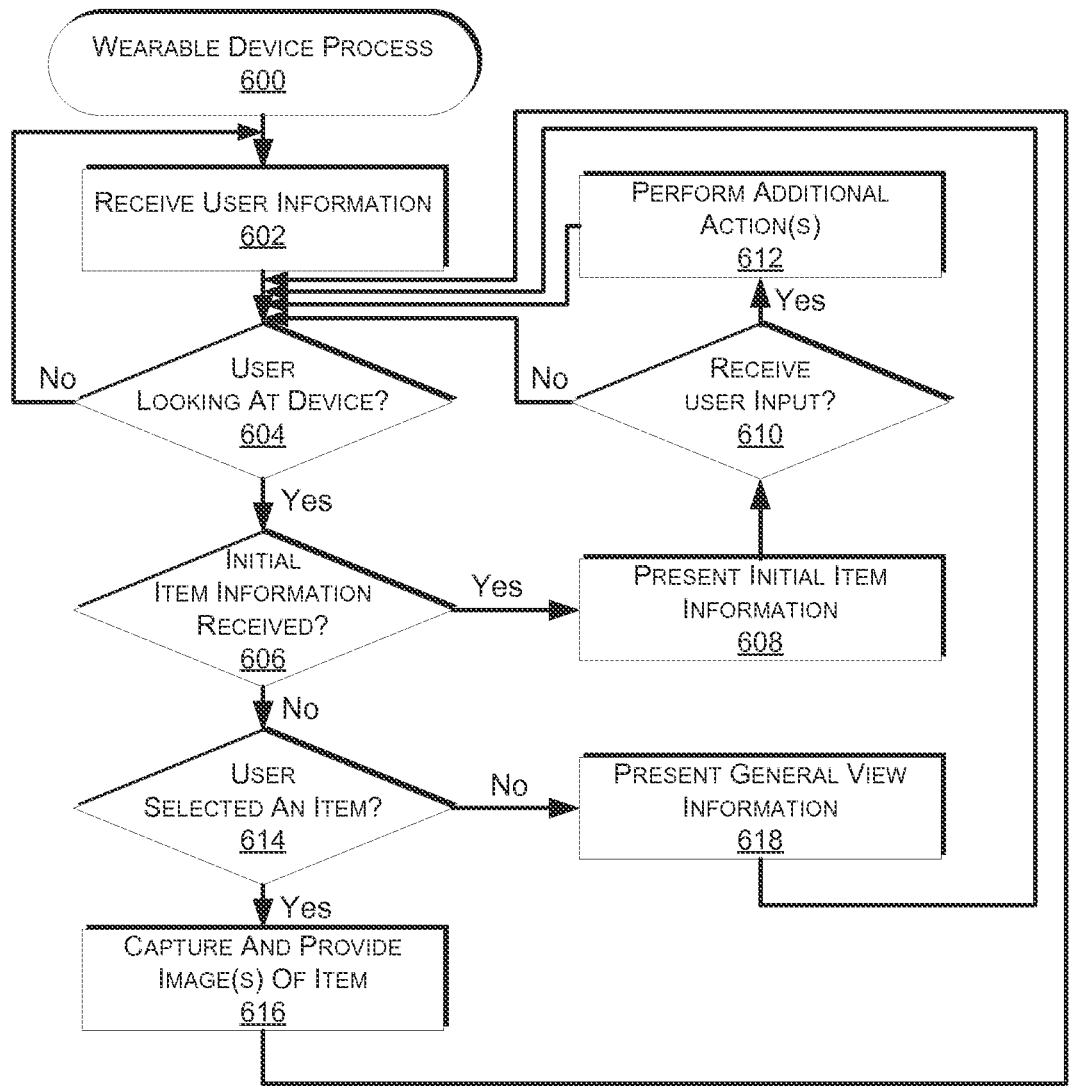
FIG. 6 depicts a flow diagram of a wearable device process, in accordance with an implementation.

FIG. 6 depicts a flow diagram of a wearable device process 600, in accordance with an implementation. The wearable device process 600 beings by receiving information about the user of the wearable device (e.g., head tracking information, gaze tracking information), as in 602. Information about the user may be obtained by using one or more of the input components (e.g., cameras) of the wearable device to obtain/capture images that are processed to determine the position of the user's head (for head tracking information) and/or the direction in which the user's eyes are looking (for gaze tracking). In addition, or as an alternative, the wearable device may receive information about the user from the information discovery system 100. Based on the received information, a determination is made as to whether the user is looking at the wearable device, as in 604. In some implementations, to preserve power, the display of the wearable device may only be illuminated for presentation when it is determined that the user is actually looking at the wearable device. If it is determined that the user is not looking at the wearable device, the wearable device remains in a low power state and the example process 600 returns to block 602 and continues.

If it is determined that the user is looking at the wearable device, a determination is made as to whether the wearable device has received initial item information, as in 606. In some implementations, this determination may be time or activity sensitive. For example, in addition to determining whether the wearable device has received initial item information, it may also be determined whether that initial item information was received and the user is still in the same area as they were when the initial item information was received. For example, if initial item information was received but the user has walked 10 feet away from the area they were in when the information was received (i.e., they have returned the item to a shelf and moved to another area), it may be determined that initial item information is not to be displayed. Other factors, such as time and/or image analysis as to whether the user is holding an item, may also be considered when determining whether initial item information has been received.

If it is determined that initial item information has been received, the initial item information is presented to the user, as in 608. Upon presenting the initial item information to the user, a determination may then be made as to whether additional actions are to be performed, as in 610. A user may request additional actions by interacting with the wearable device, such as by interacting with a control presented on the display of the wearable device. Interaction with the wearable device may be through touch of the wearable device touch screen, by audible speaking to the wearable device, through gestures, etc. For example, a user may ask for additional item information, the microphone of the wearable device (or the computing system) may detect and process the audio and perform the appropriate action. Similarly, a user may present a gesture (e.g., pointing, movement toward a display, etc.) that is detected by the wearable device and/or one or more imaging elements within the materials handling facility and the appropriate action may be performed.

Additional actions may be any other action that is to be performed with respect to the user and/or the selected item. For example, if the user selects a "More Info" control on the wearable device, the additional action may be to send a request to the information discovery system to provide additional item information to the user. If it is determined that an additional action is to be performed, the additional action is performed by the example process 600, as in 612.

Returning to decision block 606, if it is determined that initial item information has not been received, a determination may be made as to whether a user has selected an item, as in 614. Determining whether a user has selected an item may be accomplished by the wearable device querying one or more of the input components (e.g., cameras, sensors) to detect presence of an item. For example, if the user is holding an item, an imaging element of the wearable device may obtain/capture an image of the user holding the item and a determination may be made that the user has selected an item. If it is determined that the user has selected an item but initial item information has not been received by the wearable device, image information and/or item information may be captured by the wearable device and provided to the information discovery system as part of a request for initial item information, as in 616. In addition, if the information discovery system is having difficulty identifying the location of the user, the wearable device may also provide additional information to assist in identifying the location of the user. For example, the wearable device may illuminate an illumination element to assist the information discovery system in locating the wearable device and the user.

If it is determined that the user has not selected an item, general view information may be presented to the user, as in 618. General view information may be any information maintained or accessible by the wearable device. For example, the general view information may present to the user the current time and date. In some implementations, the wearable device may interact with another portable device of the user (e.g., smart phone) and obtain information from that portable device (e.g., text-message, notification) that is presented as general view information.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a wearable device worn by a user located within a materials handling facility, including:
a first wireless communication module configured to enable wireless communication with an information discovery system;
an identifier associated with a user account of the user;
a first image capture device oriented to capture a first image of the user when the user is looking toward the wearable device;
a display;
a first one or more processors; and
a first memory storing first program instructions that when executed by the first one or more processors cause the first one or more processors to at least:
maintain the wearable device in a lower power state;
receive, via the first wireless communication module and from the information discovery system, initial item information corresponding to an item;
determine, based at least in part on the first image, that the user is looking toward the wearable device;
in response to a determination that the user is looking toward the wearable device:
transition the wearable device from the lower power state to a higher power state; and
present, on the display, the initial item information; and
the information discovery system that is separate from the wearable device and remote from the user, including:
a second wireless communication module configured to enable wireless communication with the first wireless communication module of the wearable device;
a second image capture device separate from the wearable device, remote from the user, and positioned at a fixed location to remain at the fixed location within the materials handling facility, the second image capture device oriented to capture a second image of the item;
a second one or more processors; and
a second memory storing second program instructions that when executed by the second one or more processors cause the second one or more processors to at least:
process the second image and identify the item; and
send, via the second wireless communication module and to the first wireless communication module, the initial item information associated with the item.

2. The system of claim 1, wherein the first image is processed using at least one of gaze tracking or head tracking to determine that an orientation of a head of the user is directed toward the wearable device.

3. The system of claim 1, wherein the initial item information includes an identification of the item, a price of the item, or information about the item.

4. The system of claim 1, wherein the second program instructions are further configured to cause the second one or more processors to at least:
process a third image to determine that the user is looking toward an inventory shelf within the materials handling facility;
determine the initial item information corresponding to the item positioned on the inventory shelf; and
wherein the initial item information is proactively sent via the second wireless communication module and to the first wireless communication module based at least in part on a determination that the user is looking at the item on the inventory shelf.

5. The system of claim 1, wherein:
the first program instructions are further configured to cause the first one or more processors to at least:
in response to the determination that the user is looking toward the wearable device, determine that a first position of the user within the materials handling facility corresponds to a second position of the user when the initial item information was received by the first wireless communication module of the wearable device; and
the presentation, on the display, of the initial item information is based at least in part on a determination that the first position corresponds to the second position.

6. The system of claim 1, wherein:
the first program instructions are further configured to cause the first one or more processors to at least:
in response to the determination that the user is looking toward the wearable device, determine whether the user is still in a same area the user was in when the initial item information was received by the wearable device; and
the presentation, on the display, of the initial item information is based at least in part on a determination that the user is still in the same area.

7. A system, comprising:
an image capture device positioned at a fixed location to remain at the fixed location within a materials handling facility;
a non-transitory computer-readable storage medium storing instructions, the instructions when executed by a processor causing the processor to at least:
receive, from the image capture device, an image of an item located within the materials handling facility;

process the image to determine that a user has selected the item while the user is located in the materials handling facility;

in response to a determination that the user has selected the item, provide initial item information associated with the item to a wearable device worn by the user, wherein the wearable device is separate from the image capture device that captured the image of the item;

subsequent to providing the initial item information, receive from the wearable device an additional item information request;

in response to the additional item information request:
determine additional item information about the item;
select an output component, other than the wearable device, that is viewable by the user; and
send the additional item information to the output component for presentation to the user.

8. The system of claim 7, the instructions further configured to at least:
determine that an additional action is to be performed; and
perform the additional action.

9. The system of claim 8, wherein the additional action is at least one of initiate a purchase of the item, initiate a delivery of the item to the user, initiate a delivery of the item to a destination, or associate the item with a user account.

10. The system of claim 7, wherein the initial item information includes one or more of an identification of the item, an author of the item, a publication date of the item, a price of the item, a size of the item, a weight of the item, an expiration date of the item, or an ingredient of the item.

11. The system of claim 7, wherein the instructions that when executed by the processor cause the processor to determine that the user has selected the item, include instructions to at least:
determine a location area of the user within a materials handling facility;
receive an image of the item selected by the user; and
identify the item based at least in part on a comparison of information obtained from the image with stored item information for items at the location area of the user.

12. The system of claim 7, the instructions when executed by the processor further cause the processor to at least:
receive an image of the user when the user arrives at a materials handling facility;
process the image to identify the user; and
identify a user account associated with the user.

13. The system of claim 7, wherein the wearable device is temporarily associated with the user.

14. A computer implemented method, comprising:
maintaining a wearable device in a lower power state;
obtaining, with an image capture device of the wearable device, an image of a user wearing the wearable device;
determining, based at least in part on the image, if the user is looking toward the wearable device;
in response to determining that the user is looking toward the wearable device:
transitioning the wearable device to a higher power state;
emitting from an illumination element of the wearable device a light or light pattern that is not perceivable by a human but detectable by one or more image capture devices to assist an information discovery system in identifying the wearable device;
determining, by the wearable device, if initial item information associated with an item has been received by the wearable device; and
in response to determining that initial item information has been received, presenting on a display of the wearable device, the initial item information.

15. The computer implemented method of claim 14, further comprising:
receiving an input from the user; and
performing an additional action.

16. The computer implemented method of claim 14, further comprising:
in response to determining, by the wearable device, that initial item information has not been received:
determining that the user has selected an item;
receiving an image of the item;
receiving initial item information about the item; and
initiating a presentation of the initial item information.

17. A system, comprising:
a wearable device worn by a user located within a materials handling facility, including:
a first wireless communication module configured to wirelessly communicate with a second wireless communication module of an information discovery system;
a display;
a first one or more processors;
a first memory storing first program instructions that when executed by the first one or more processors cause the first one or more processors to at least:
maintain the wearable device in a lower power state;
receive, via the first wireless communication module and from the information discovery system, initial item information corresponding to an item;
determine that the user is looking toward the wearable device;
in response to a determination that the user is looking toward the wearable device;
transition the wearable device from the lower power state to a higher power state; and
present, on the display, at least a portion of the initial item information received from the information discovery system; and
the information discovery system that is separate from the wearable device and remote from the user, including:
the second wireless communication module configured to wirelessly communicate with the first wireless communication module;
an image capture device separate from the wearable device, remote from the user, and positioned at a fixed location to remain at the fixed location within the materials handling facility, the image capture device positioned to capture an image of the item selected by the user from a shelf within the materials handling facility;
a computing resource configured to process the image of the item to determine an identity of the item;
a processor; and
a memory storing program instructions that when executed by the processor cause the processor to at least:
determine the initial item information corresponding to the item; and
send to the wearable device for presentation on the display of the wearable device, the initial item information.

18. The system of claim 17, further comprising:
an output component positioned within the materials handling facility and within a viewable distance of the user; and wherein the program instructions stored in the memory of the information discovery system further cause the processor of the information discovery system to at least:

determine that additional item information corresponding to the item is to be presented to the user; and send additional item information to the output component for presentation to the user.

19. The system of claim 18, wherein the output component is at least one of a display coupled to the shelf, or a projector.

20. The system of claim 17, wherein the program instructions stored in the memory of the information discovery system, further cause the processor to at least:

determine that the user has walked away with the item selected from the shelf; and initiate a purchase of the item by the user.

* * * * *